United States Patent
Matsumura

(10) Patent No.: US 6,786,088 B2
(45) Date of Patent: Sep. 7, 2004

(54) GAS FLOW RATE MEASURING APPARATUS

(75) Inventor: Takafumi Matsumura, Hitachinaka (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 10/262,655

(22) Filed: Oct. 2, 2002

(65) Prior Publication Data

US 2003/0154781 A1 Aug. 21, 2003

(30) Foreign Application Priority Data

Feb. 20, 2002 (JP) ........................................ 2002-042953

(51) Int. Cl.[7] .............................................. G01F 1/68
(52) U.S. Cl. ................................................. 73/204.15
(58) Field of Search .......................... 73/204.15, 204.26, 73/204.16, 204.17, 204.19, 204.25

(56) References Cited

U.S. PATENT DOCUMENTS

| | | | | |
|---|---|---|---|---|
| 4,587,842 A | * | 5/1986 | Handtmann | 73/204.14 |
| 5,440,924 A | * | 8/1995 | Itsuji et al. | 73/204.25 |
| 5,569,847 A | * | 10/1996 | Hasegawa et al. | 73/117.3 |
| 5,753,815 A | * | 5/1998 | Murata | 73/204.15 |
| 5,834,636 A | * | 11/1998 | Sasaki et al. | 73/117.3 |
| 6,230,559 B1 | * | 5/2001 | Igarashi et al. | 73/204.25 |

FOREIGN PATENT DOCUMENTS

| | | |
|---|---|---|
| JP | 5-164583 | 6/1993 |
| JP | 7-139985 | 2/1995 |
| JP | 8-86678 | 2/1996 |
| JP | 11-37815 | 2/1999 |

* cited by examiner

*Primary Examiner*—Edward Lefkowitz
*Assistant Examiner*—Jewel V. Thompson
(74) *Attorney, Agent, or Firm*—Crowell & Moring LLP

(57) ABSTRACT

An apparatus for measuring a gas flow rate, which includes one or more resistors arranged in a gas passage, and a gas flow rate detection circuit for outputting a gas flow rate detection signal in accordance with a gas flow rate by detecting currents flowing through the resistors or voltages generated in accordance with the currents. The apparatus includes a fixed resistor connected in series to one of the resistors, and a first A/D converter circuit for converting an input voltage into a digital signal based on a reference voltage and outputting the digital signal by using a voltage generated in the fixed resistor as the reference voltage and using a voltage generated in a combined resistance of the resistor and the fixed resistor as the input voltage, wherein a digital output signal of a gas temperature detection signal is obtained by the first A/D converter circuit.

13 Claims, 10 Drawing Sheets

US 6,786,088 B2

GAS FLOW RATE MEASURING APPARATUS

BACKGROUND OF THE INVENTION

The present invention relates to a gas flow rate measuring apparatus for measuring an intake air flow rate in an engine (internal combustion engine), and specifically, relates to a gas flow rate measuring apparatus suitable for obtaining not only the gas flow rate but also a gas temperature detection signal.

In automotive engines, measurement of the intake air flow rate is necessary to control a fuel injection quantity.

One type of the apparatus for measuring an intake air flow rate is a heat resistor type gas flow rate measuring apparatus. A detection circuit of the heat resistor type gas flow rate measuring apparatus includes a bridge circuit composed of a heat resistor (also called a hot wire), a gas temperature measuring resistor (also called a cold wire), and two fixed resistors. The heat resistor and the gas temperature measuring resistor are placed in an intake gas passage.

The heat resistor type gas flow rate measuring apparatus has a constitution of controlling power supply so as to keep constant temperature of the heat resistor in the bridge circuit to maintain a resistance balance of the bridge circuit.

With such a constitution, heat release rate of the heat resistor is increased in accordance with an increase of the intake gas flow rate in the intake gas passage. Meanwhile, a current is increased so as to keep the temperature of the heat resistor constant. Accordingly, the air flow rate can be measured based on a voltage $V_2$ which appears across the fixed resistor connected in series to the heat resistor.

The voltage $V_2$ is processed in an adjustment arithmetic circuit with a predetermined input-output characteristic to have a required air flow rate-signal characteristic, and then outputted from the adjustment arithmetic circuit as a flow rate signal in a predetermined relationship with the air flow rate.

Incidentally, for an output signal characteristic of the gas flow rate measuring apparatus, it is desired that change in the output signal is small even when the temperature is changed, in other words, a temperature dependent error is small.

The temperature dependent error falls into two main categories: an error dependent on gas temperature and an error dependent on circuit substrate temperature. The gas temperature dependent error is caused by change in the gas temperature while the circuit substrate temperature is constant. The substrate temperature dependent error is caused by change in the circuit substrate temperature while the gas temperature is constant.

In order to reduce the temperature dependent error, it is necessary to compensate the temperature dependent error of the gas flow rate detection signal using detection signals of the gas temperature and the substrate temperature.

With regard to the compensation of the gas temperature dependent error, for example, there is a technology described in a JP-A-11-37815 gazette. In the technology described in the gazette, the intake air passage includes a separate temperature sensor such as a thermistor arranged therein. The gas temperature dependent error is compensated by digital operation using the temperature detection signal thereof.

The thermistor is cheap, but resistance value thereof is an exponential function of an inverse of temperature so that the temperature detection signal is non-linear with respect to the temperature. Accordingly, operation during the digital operation is complicated, and the circuitry thereof becomes complicated.

Instead of the thermistor, a Pt (platinum) resistor having an output characteristic with a good linearity can be used. However, the Pt resistor is expensive, and the apparatus cost is increased. Accordingly, the Pt resistor is not preferred.

As described above, the gas temperature measuring resistor is arranged in the gas flow rate measuring apparatus. From this perspective, several methods of not only obtaining the air flow rate signal but also outputting the gas temperature detection signal from the gas flow rate measuring apparatus are proposed.

For example, in a technology described in a JP-A-5-164583 gazette, the gas temperature measuring resistor is driven by a constant current to take out a voltage drop, and thus the gas temperature detection signal is obtained. Simultaneously, a multiplier circuit is connected to a constant temperature control circuit of the heat resistor. The input of the constant temperature control circuit is multiplied by the above described voltage drop.

JP-A-7-139985 and JP-A-8-86678 gazettes describe technologies of obtaining the gas temperature detection signal.

Specifically, in the technologies described in the above gazettes, a voltage $V_1$ appearing across a combined resistance of the gas temperature detection resistor and the fixed resistor, or a voltage $V_1$ appearing across a combined resistance of the heat resistor and the fixed resistor, and a voltage $V_3$ appearing across the fixed resistor connected in series between the gas temperature measuring resistor and the ground, or a voltage $V_2$ appearing across the fixed resistor connected in series between the heat resistor and the ground are inputted to a divider circuit composed of an analogue circuit to obtain $V_1/V_2$ or $V_1/V_3$, respectively, and the gas temperature detection signal is thus obtained.

SUMMARY OF THE INVENTION

However, in the above described conventional art, since a multiplier circuit or divider circuit composed of an analogue circuit is used to obtain a gas temperature detection signal, performance of the circuit is widely varied due to production variation, and there has been a fear of increase in man-hour for adjustment for each product.

Moreover, since a temperature dependent error is caused in the analogue circuit, when the temperature at the circuit portion is changed, the output of the gas temperature detection signal could be changed while the gas temperature does not change. Therefore, the man-hour for design or adjustment for reducing the temperature dependent error is increased, and thus manufacturing costs are increased.

Therefore, in order to compensate the output error of the gas flow rate detection circuit with high accuracy, it can be conceived that the gas temperature detection signal is obtained using a digital circuit.

However, if the digital circuit is simply applied for obtaining the gas temperature detection signal, the circuitry becomes complicated and the price thereof is increased.

An object of the present invention is to realize a gas-flow rate measuring apparatus including a digital circuit capable of easily taking out a highly accurate gas temperature detection signal in a simple constitution by a small cost increase.

In order to achieve the above described object, the present invention is constituted as follows.

(1) In an apparatus for measuring a gas flow rate, which includes one or a plurality of resistors arranged in a gas passage and a gas flow rate detection circuit for outputting a gas flow rate detection signal in accordance with a gas flow rate flowing in the gas passage by detecting currents flowing through the resistors or voltages generated in accordance with the currents, the apparatus includes a fixed resistor connected in series to one of the resistors; and a first A/D converter circuit for converting an input voltage into a digital signal and outputting the digital signal by using a voltage generated in the fixed resistor as a reference voltage and using a voltage generated in a combined resistance of the resistor and the fixed resistor as the input voltage, and a digital output signal of a gas temperature signal is obtained by the first A/D converter circuit.

(2) In an apparatus for measuring a gas flow rate, which includes one or a plurality of resistors arranged in a gas passage, and a gas flow rate detection circuit for outputting a gas flow rate detection signal in accordance with a gas flow rate flowing in the gas passage by detecting currents flowing through the resistors or voltages generated in accordance with the currents, the apparatus includes a fixed resistor connected in series to the resistors; a first A/D converter circuit-for converting an input voltage into a digital signal and outputting the digital signal by using a voltage generated in a combined resistance of the resistor and the fixed resistor as the input voltage; a second A/D converter circuit for converting an input voltage into a digital signal and outputting the digital signal by using a voltage generated in the fixed resistor as the input voltage; and a first digital arithmetic circuit for dividing the digital output signal from the first A/D converter circuit by the digital output signal from the second A/D converter circuit, and a digital output signal of a gas temperature signal is obtained by the first digital arithmetic circuit.

(3) In an apparatus for measuring a gas flow rate, which includes a heat resistor arranged in a gas passage; a first fixed resistor connected in series to the heat resistor; a gas temperature measuring resistor arranged in the gas passage; a second fixed resistor connected in series to the gas temperature measuring resistor; current control means for controlling a current flowing through a bridge circuit including the heat resistor, the first fixed resistor, the gas temperature measuring resistor, and the second fixed resistor; and a gas flow rate detection circuit for outputting a gas flow rate detection signal in accordance with a gas flow rate flowing in the gas passage based on the current flowing through the bridge circuit, the apparatus includes an A/D converter circuit for converting an input voltage into a digital signal based on a reference voltage and outputting the digital signal by using any one of a voltage at a junction of the heat resistor and the first fixed resistor and a voltage at a junction of the gas temperature measuring resistor and the second fixed resistor as the reference voltage, and using a voltage generated in a combined resistance of the gas temperature measuring resistor and the second fixed resistor as the input voltage, and a digital output signal of a gas temperature signal is obtained by the A/D converter circuit.

According to the invention described in the above (1), the first A/D converter circuit is effectively used, and has a function substantially similar to a divider, so that the divider becomes unnecessary. Accordingly, the digital value of the gas temperature signal can be calculated independently of changes in the reference voltage and the input-voltage in a simple constitution.

Moreover, since the digital value of the gas temperature signal is configured to be linear with respect to change in the gas temperature, a table or the like becomes unnecessary.

Accordingly, the gas flow rate measuring apparatus can be realized, which includes a digital circuit capable of taking out a highly accurate gas temperature detection signal easily in a simple configuration with minimizing cost rise.

According to the invention above described (2), various circuitries for obtaining a digital value of the gas temperature signal can be conceived. With the constitution as the above (2), the circuitry can be simple, and the digital value of the gas temperature signal can be calculated independently of changes in the reference voltage and the input voltage.

Accordingly, the gas flow rate measuring apparatus can be realized, which includes a digital circuit capable of taking out a highly accurate gas temperature detection signal easily in a simple configuration with minimizing cost rise.

Other objects, features and advantages of the invention will become apparent from the following description of the embodiments of the invention taken in conjunction with the accompanying drawings.

DESCRIPTION OF THE EMBODIMENTS

Hereinafter,-description will be made in detail on embodiments of a gas flow rate measuring apparatus according to the present invention with reference to the accompanying drawings.

Now, description will be made on a first embodiment of the present invention using FIGS. 1 and 2.

Figure 1:
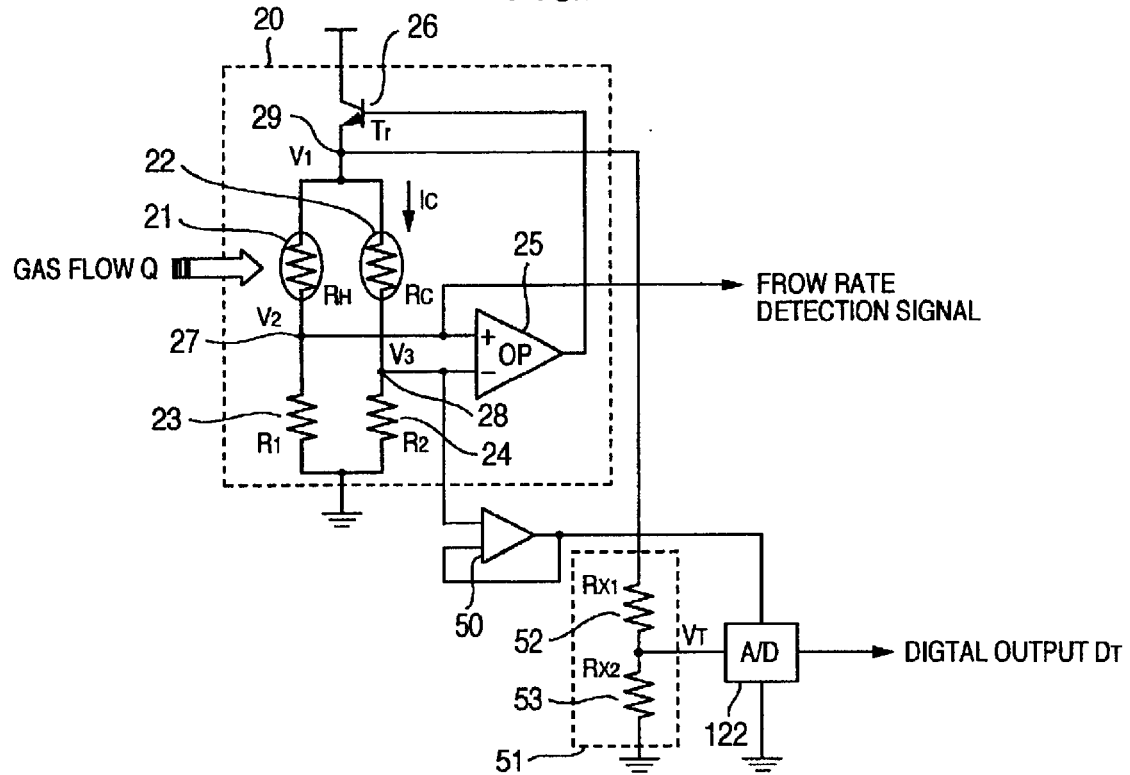
FIG. 1 schematically shows a constitution of a gas temperature detection circuit in a gas flow rate measuring apparatus according to a first embodiment of the present invention.

FIG. 1 schematically shows a constitution of a gas temperature detection circuit in the gas flow rate measuring apparatus according to the first embodiment of the present invention. FIG. 2 schematically shows a sectional view of a state where a gas flow rate measuring apparatus 10 according to the first embodiment of FIG. 1 is fitted to a gas passage body 200.

In FIG. 1, a gas flow rate detection circuit 20 includes a bridge circuit having a heat resistor (also called a hot wire) 21, a gas temperature measuring resistor (also called a cold wire) 22, and two fixed resistors 23 and 24. The heat resistor 21 and the gas temperature measuring resistor 22 are arranged in an intake gas passage.

A series connection terminal 27 at a junction of the heat resistor 21 and the fixed resistor 23 is connected to a non-inverting input terminal of an operational amplifier 25. A series connection terminal 28 at a junction of the gas temperature measuring resistor 22 and the fixed resistor 24 is connected to an inverting input terminal of-the operational amplifier 25.

An emitter of a power transistor 26 is connected to a junction of the heat resistor 21 and the gas temperature measuring resistor 22. A collector of the power transistor 26 is connected to a power supply. An output terminal of the operational amplifier 25 is connected to the base of the power transistor 26. A junction of the fixed resistors 23 and 24 is connected to the ground.

In the above described constitution, power supply control is performed by detecting a balance state of the bridge circuit with the operational amplifier 25, and controlling the power transistor 26 to balance the bridge circuit to maintain a temperature of the heat resistor 21.

When the power supply control is performed for the bridge circuit as described above, at the series connection terminal 27, which is the junction of the heat resistor 21 and the fixed resistor 23, a direct current potential (analogue flow rate signal) $V_2$ corresponding to a gas flow rate Q is generated.

Figure 2:
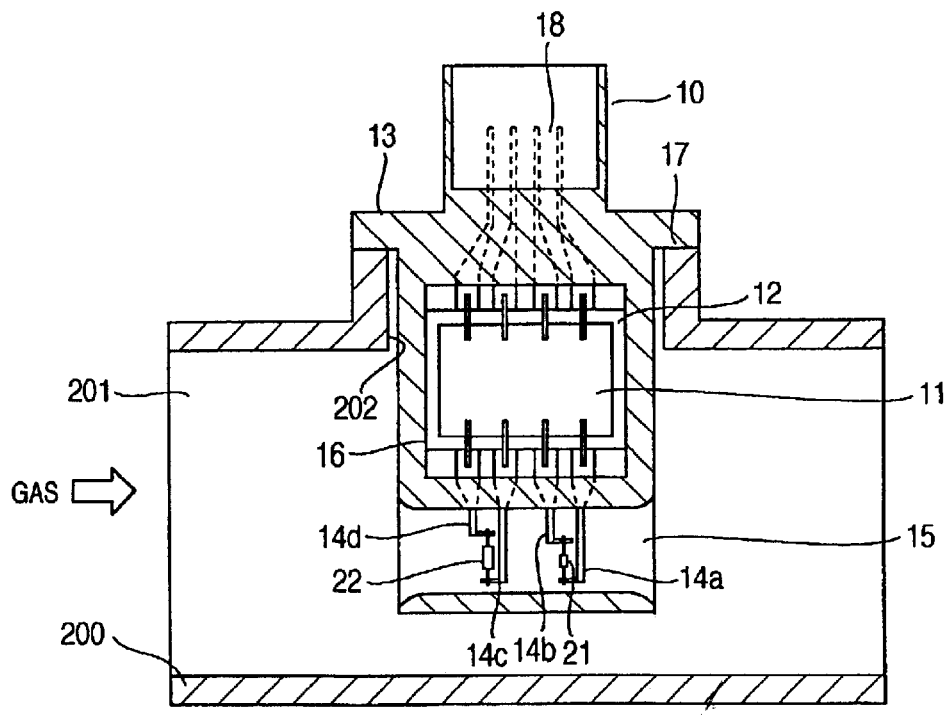
FIG. 2 is a sectional view schematically showing a state where the gas flow rate measuring apparatus according to the first embodiment of the present invention is fitted to a gas passage body.

As shown in FIG. 2, an electronic circuit of the gas flow rate measuring apparatus 10 is mounted on a hybrid IC (integrated circuit) substrate 11 with the exception of the heat resistor 21 and the gas temperature measuring resistor 22, which are brought into contact with a gas to be measured.

The hybrid IC substrate 11 is adhered and attached to a base 12 with good heat conductivity, for example, which is made of aluminum or the like, and then attached to a case 13 formed by resin molding.

The case 13 is attached to the gas passage body 200 forming the intake gas passage of an internal combustion engine to have a constitution that the heat resistor 21 and the gas temperature measuring resistor 22 of the gas flow rate detection circuit 20 and the base 12 are exposed to the gas flowing through the intake gas passage 201.

The case 13 includes a sub passage 15, a substrate housing 16, an attachment flange 17, and a connector terminal part 18. The heat resistor 21 and the gas temperature measuring resistor 22 are connected to electrode pins 14a to 14d protruding in the sub passage 15. Furthermore, the hybrid IC substrate 11 attached to the base 12 is housed in the substrate housing 16. The sub passage 15 and the substrate housing 16 are inserted into the intake gas passage 201 through an attachment window 202 formed in the sidewall of the gas passage body 200, and protruded so as to positioned within the intake gas passage 201. The flange 17 is then screwed to be fixed on the gas passage body 200.

With such a constitution described above, part of the gas flown into the intake gap passage 201 is flown into the sub passage 15.

The electrode pins 14a to 14d are connected to the hybrid IC substrate 11. The hybrid IC substrate 11 is connected via the connector terminal part 18 to connecting cables (not shown) from an external device.

In the gas flow rate measuring apparatus 10 constituted as described above, the operational amplifier 25 controls the power transistor 26 so as to balance the bridge circuit composed of the resistors 21 to 24 of the gas flow rate detection circuit 20, thus controlling a heating current.

The temperature of the heat resistor 21 is increased by heat generation by the heating current and thus the resistance value thereof is increased. Then the heat resistor 21 releases heat to the gas flowing in the sub passage 15 to decrease in temperature, and the resistance thereof is to decrease.

However, the resistance value of the heat resistor 21 is maintained to be substantially constant by the action of the bridge circuit. Accordingly, as the flow rate of the gas flowing in the sub passage 15 is increased, the heat release rate of the heat resistor 21 is increased, and the heating current flowing through the heat resistor 21 is thereby increased.

At the fixed resistor 23 connected in series to the heat resistor 21, the voltage $V_2$ corresponding to the gas flow rate Q flowing through the intake gas passage 201 is hence generated.

In order to detect the gas temperature by use of the gas flow rate detection circuit 20, as shown in FIG. 1, a voltage $V_3$ appearing at the series connection terminal 28, which is the junction of the gas temperature measuring resistor 22 and the fixed resistor 24 connected in series between the gas temperature measuring resistor 22 and the ground, is connected to a reference voltage input of an A/D converter circuit 122 via a buffer 50. Note that the buffer 50 may be omitted.

To supply the voltage $V_1$ appearing at the combined resistance of the gas temperature measuring resistor 22 and the fixed resistor 24 to a level shift circuit 51, a junction 29 of the gas temperature measuring resistor 22 and the emitter of the power transistor 26 is grounded via resistors 52 and 53. Here, the level shift circuit 51 includes the resistors 52 and 53.

An output $V_T$ from the level shift circuit, that is, the voltage $V_T$ at the junction of the resistors 52 and 53 is supplied to a conversion input of the A/D converter circuit 122. The A/D converter circuit 122 converts the supplied voltage $V_T$ into a digital value $D_T$.

With the constitution described above, an accurate digital output of the gas temperature signal can be obtained in a simple constitution. Next, the reason will be described.

With regard to $V_T$, the following equation (1) is established.

$$V_T = R_{X2} \cdot V_1/(R_{X1}+R_{X2}) \qquad (1)$$

Here, $R_{x1}$ and $R_{x2}$ are the resistance values of the resistors 52 and 53, respectively.

When the A/D converter circuit 122 has a resolution of n bits (n is a natural number) and an input voltage range from the ground to $V_3$, a quantum number q of the A/D converter circuit 122 is represented by the following equation (2).

$$q = V_3/2^n \qquad (2)$$

Accordingly, the gas temperature signal digital output $D_T$ from the A/D converter circuit 122 is represented by the following equation (3).

$$D_T = V_T/q = \{R_{X2}/(R_{X1}+R_{X2})\} \cdot 2^n \cdot V_1/V_3 \qquad (3)$$

Here, the voltages $V_1$ and $V_3$ are represented by the following equations (4) and (5), respectively.

$$V_1 = I_C \cdot (R_2 + R_C) \qquad (4)$$

$$V_3 = I_C \cdot R_2 \qquad (5)$$

Here, $R_C$ and $R_2$ are the resistance values of the gas temperature measuring resistor 22 and the fixed resistor 24, respectively, and $I_C$ is a current flowing through the gas temperature measuring resistor 22.

Furthermore, the resistance value $R_C$ of the gas temperature measuring resistor 22 is approximated by a linear expression to be represented by the following equation (6).

$$R_C = R_{C0} \cdot (1 + \alpha_C \cdot T) \qquad (6)$$

Here, $R_{C0}$ is a resistance value of the gas temperature measuring resistor 22 at 0° C., $\alpha_C$ is a temperature coefficient TCR, and T is the gas temperature.

The above equations (4) to (6) are substituted into the equation (3) and rearranged to obtain the following equation (7).

$$D_T = \{2^n \cdot R_{X2}/(R_{X1}+R_{X2})\} \cdot \{(1+R_{C0}/R_2) + (R_{C0}/R_2) \cdot \alpha_C \cdot T\} \qquad (7)$$

From the above equation (7), for the gas temperature signal digital output $D_T$, an output characteristic represented by a linear expression of the temperature T can be obtained.

The gas temperature signal digital output $D_T$ can be calculated from the above equation (7) independently of the voltages $V_1$ and $V_3$. Specifically, even when the voltages $V_1$ and $V_3$ are changed with change in the gas flow rate, the gas temperature signal digital output $D_T$ is not changed. Moreover, the resolution of analog-to-digital conversion for the temperature is not changed.

Figure 3:
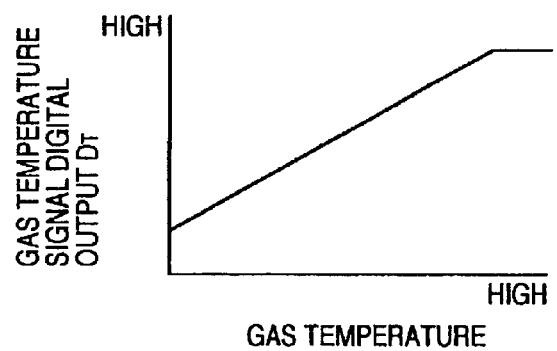
FIG. 3 is a graph schematically showing a relation between a digital output of a gas temperature signal and a gas temperature in the constitution of FIG. 1.

FIG. 3 is a graph schematically showing a relation between the gas temperature signal digital output $D_T$ and the gas temperature.

As shown in FIG. 3, at the gas temperature more than a certain value, the gas temperature signal digital output $D_T$ exceeds a conversion range of the A/D converter circuit 122, and is saturated to be a constant value. Accordingly, the resistance values $R_{X1}$ and $R_{X2}$ of the resistors 52 and 53 of the level shift circuit 51 should be selected properly so as to detect a desired maximum temperature.

Figure 4:
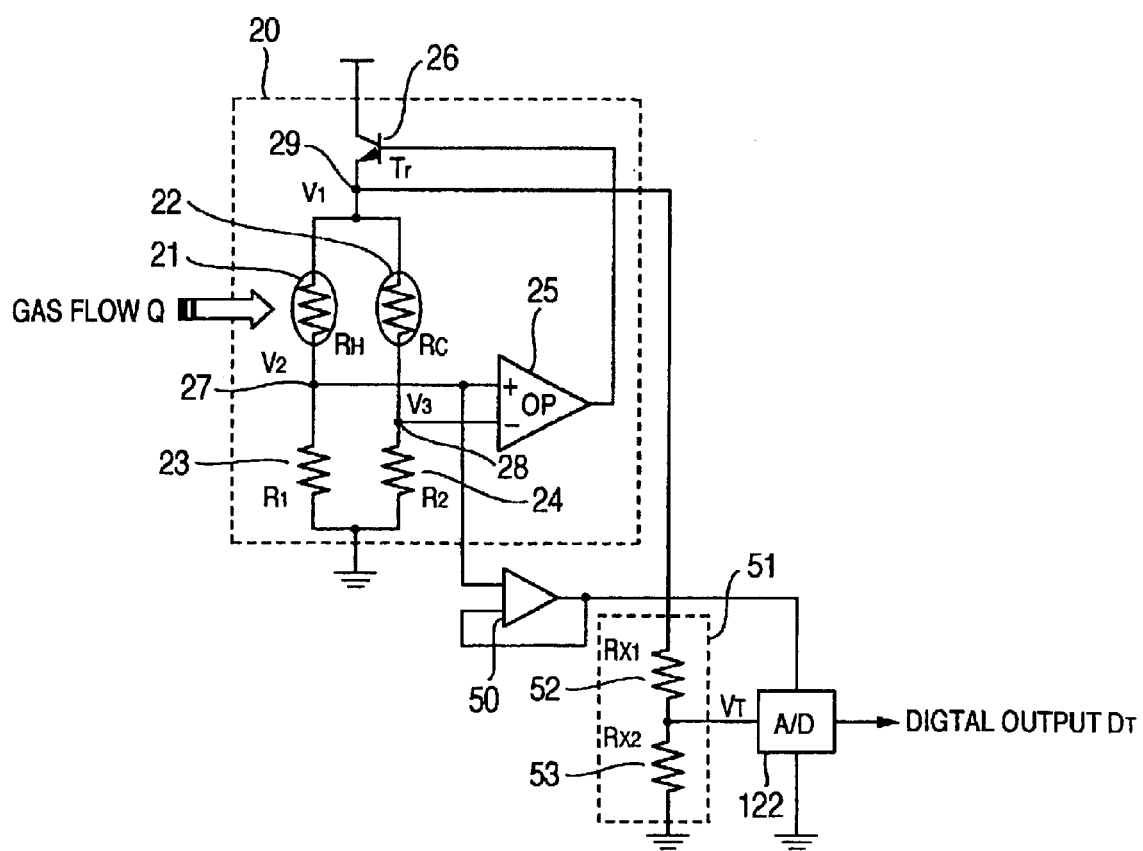
FIG. 4 shows a modification example of the first embodiment of the present invention.

FIG. 4 shows a modification example of the first embodiment of the present invention. With the constitution shown in FIG. 4, the digital signal of the gas temperature signal can be also detected.

The constitution shown in FIG. 4 is approximately the same as the constitution shown in FIG. 1. The difference therebetween is that, as the input of the buffer 50, the voltage $V_2$ at the junction of the heat resistor 21 and the fixed resistor 23 is used instead of the voltage $V_3$ at the junction of the gas temperature measuring resistor 22 and the fixed resistor 24.

In the constitution shown in FIG. 4, the gas temperature signal digital output $D_T$ from the A/D converter circuit 122 can be derived similarly to the above equation (7).

Specifically, the resistance value $R_H$ of the heat resistor 21 is represented by the following equation (8).

$$R_H = R_{H0} \cdot \{1 + \alpha_H \cdot (T + \Delta T)\} \qquad (8)$$

Here, $R_{H0}$ is the resistance value of the heat resistor 21 at 0° C., $\alpha_H$ is the temperature coefficient TCR, $\Delta T$ is a temperature increase from the gas temperature at the heat resistor 21, which is a constant value determined for each apparatus.

The gas temperature signal digital output $D_T$ is represented by the following equation (9).

$$D_T = \{2^n \cdot R_{X2}/(R_{X1}+R_{X2})\} \cdot \{1 + (R_{H0}/R_1) \cdot (1 + \alpha_H \cdot \Delta T) + (R_{H0}/R_1) \cdot \alpha_H \cdot T\} \qquad (9)$$

Here, $R_1$ is the resistance value of the fixed resistor 23.

Similarly to the example shown in FIG. 1, the gas temperature signal digital output $D_T$ can be calculated from the above equation (9) independently of the voltages $V_1$ and $V_2$. Even when the voltages $V_1$ and $V_2$ are changed by change in the gas flow rate, the gas temperature signal digital output $D_T$ is not changed. Moreover, the resolution of analog-to-digital conversion for the temperature is not changed.

As described above, according to the first embodiment of the present invention, the voltage $V_3$ at the junction of the gas temperature measuring resistor 22 and the fixed resistor 24, which are connected in series in the bridge circuit, or the voltage $V_2$ at the junction of the heat resistor 21 and the fixed resistor 23, which are connected in series in the bridge circuit, is supplied to the A/D converter circuit 122 as a reference voltage. The voltage corresponding to the potential $V_1$ between the bridge circuit and the ground is supplied to the A/D converter circuit 122 as an input signal.

In other words, effective use of the A/D converter circuit 122 allows the A/D converter circuit 122 to have a function substantially similar to a divider, so that the divider becomes unnecessary. Accordingly, the gas temperature signal can be calculated in a simple constitution independently of the values of the voltages $V_1$ and $V_3$, or the voltages $V_1$ and $V_2$.

When the digital signal of the gas temperature signal does not have linearity with respect to change in the gas temperature, a table for indicating a relation between the gas temperature and the digital signal is provided and retrieval is carried out, or an arithmetic circuit for complicated arithmetic operation is required. However, according to the first embodiment of the present invention, since the digital signal of the gas temperature signal is configured to have linearity with respect to change in the gas temperature, the table or the like is unnecessary.

Accordingly, the gas flow rate measuring apparatus can be realized, which includes a digital circuit capable of taking out a highly accurate gas temperature detection signal easily in a simple constitution by a small cost increase.

Next, description will be made on a second embodiment of the present invention using FIG. 5 in comparison with FIG. 1.

Figure 5:
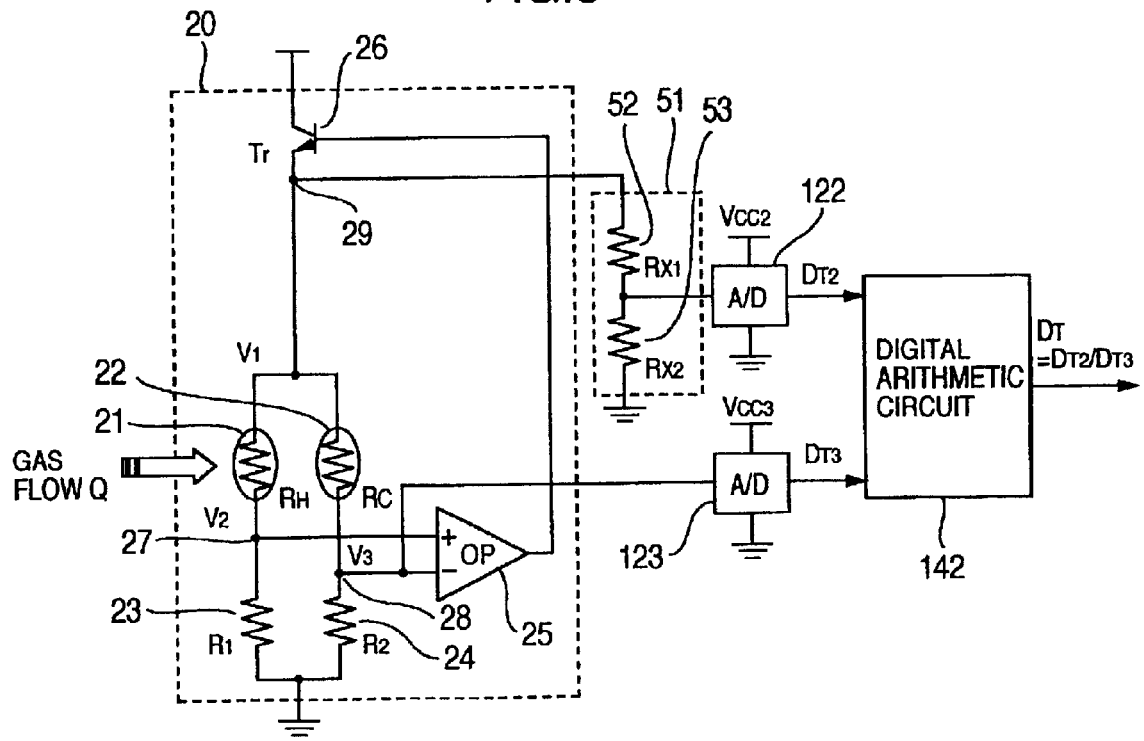
FIG. 5 schematically shows a constitution of a gas temperature detection circuit in a gas flow rate measuring apparatus according to a second embodiment of the present invention.

FIG. 5 schematically shows a constitution of a gas temperature detection circuit in a gas flow rate measuring apparatus according to a second embodiment of the present invention.

The difference between the example shown in FIG. 1 and the example shown in FIG. 5 is as follows. In the example of FIG. 5, the buffer 50 of the example in FIG. 1 is omitted; and an A/D converter circuit 123 is added. The voltage $V_3$ appearing at the series connection terminal 28, which is the junction of the gas temperature measuring resistor 22 and the fixed resistor 24, is inputted to the conversion input of the added A/D converter circuit 123.

Furthermore in the example of FIG. 5, the outputs from the A/D converter circuits 122 and 123 are inputted to a digital arithmetic circuit 142.

Note that the reference voltages are separately supplied to the A/D converter circuits 122 and 123, but the A/D converter circuits 122 and 123 may share a reference voltage source.

When resolutions of the A/D converter circuits 122 and 123 are, respectively, n bits and m bits, and the conversion input ranges are, respectively, from the ground to voltages $V_{cc2}$ and $V_{cc3}$, quantum numbers $q_2$ and $q_3$ are represented by the following equations (10) and (11), respectively.

$$q_2 = V_{cc2}/2^n \quad (10)$$

$$q_3 = V_{cc3}/2^m \quad (11)$$

The digital outputs $D_{T2}$ and $D_{T3}$ of the A/D converter circuits 122 and 123 are represented by the following equations (12) and (13), respectively.

$$D_{T2} = \{R_{X2} \cdot V/(R_{X1}+R_{X2})\}/q_2 \quad (12)$$

$$D_{T3} = V_3/q_3 \quad (13)$$

The digital output $D_{T2}$ represented by the above equation (12) is divided by the output $D_{T3}$ represented by the above equation (13) in the digital arithmetic circuit 142 to obtain the following equation (14). The digital output $D_T$ from the digital arithmetic circuit 142 is represented by a linear expression of the temperature T.

$$D_T = D_{T2}/D_{T3} = \{R_{X2}/(R_{X1}+R_{X2})\} \cdot (V_1/V_3) \cdot (q_3/q_2) = \{R_{X2}/(R_{X1}+R_{X2})\} \cdot (q_3/q_2) \cdot \{1+(R_{C0}/R_2) \cdot (1+\alpha_C \cdot T)\} \quad (14)$$

Here, the following equations (15) and (16) are assumed.

$$n = m \quad (15)$$

$$V_{cc2} = V_{cc3} \quad (16)$$

Assuming the above equations (15) and (16), the following equation (17) is obtained.

$$D_T = D_{T2}/D_{T3} = \{R_{X2}/(R_{X1}+R_{X2})\} \cdot \{1+(R_{C0}/R_2) \cdot (1+\alpha_C \cdot T)\} \quad (17)$$

Figure 6:
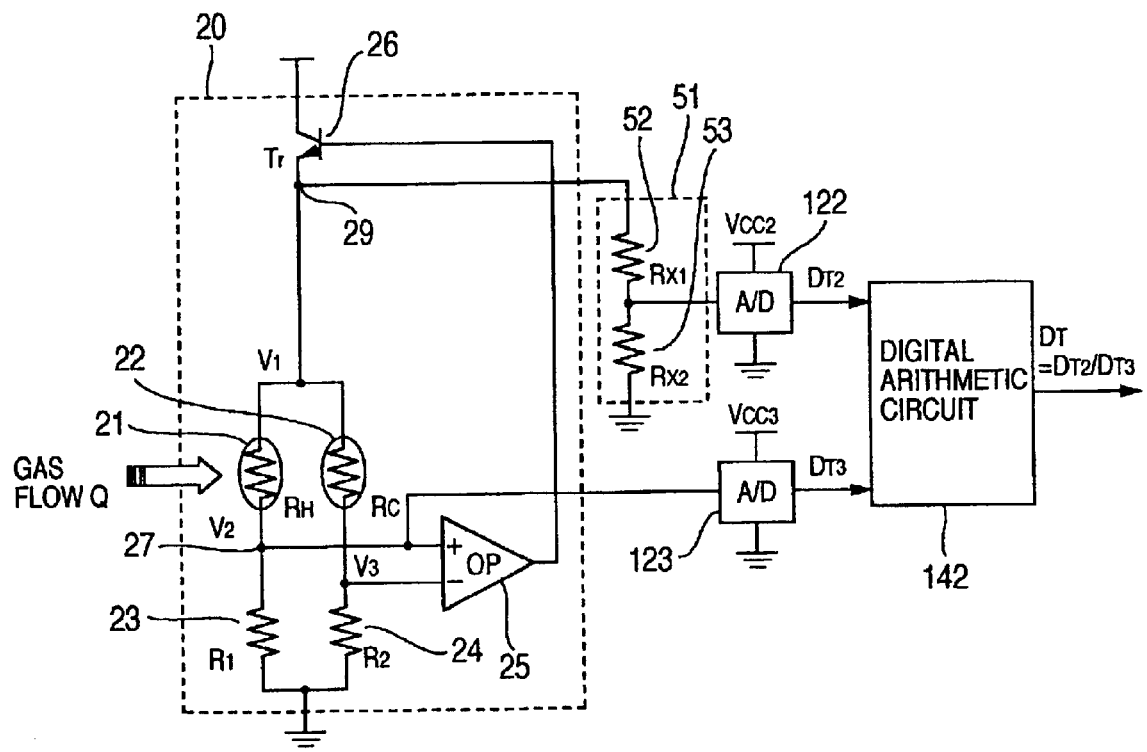
FIG. 6 shows a modification example of the second embodiment of the present invention.

FIG. 6 shows a modification example according to the second embodiment of the present invention.

The constitution shown in FIG. 6 is approximately the same as the constitution of the example in FIG. 5. The difference therebetween is that, as the input of the A/D converter circuit 123, the voltage $V_2$ appearing at the connection terminal 27, which is the junction of the heat resistor 21 and the fixed resistor 23, is supplied instead of the voltage $V_3$ appearing at the connection terminal 28, which is the junction of the gas temperature measuring resistor 22 and the fixed resistor 24.

In the constitution of the example shown in FIG. 6, the operation output $D_T$ from the digital arithmetic circuit 142 is derived similarly to the equation (17) and represented by the following equation (18).

$$D_T = D_{T2}/D_{T3} = \{R_{X2}/(R_{X1}+R_{X2})\} \cdot \{1+(R_{H0}/R_1) \cdot (1+\alpha_H \cdot \Delta T)+(R_{H0}/R_1) \cdot \alpha_H \cdot T\} \quad (18)$$

In the circuitry shown in FIG. 6, the A/D converter circuit 123 receives the flow rate detection signal $V_2$ from the gas flow rate detection circuit 20 and converts the flow rate detection signal $V_2$ into a digital value. Accordingly, the A/D converter circuit 123 also serves as an A/D converter circuit for converting the flow rate detection signal $V_2$ into a digital value and inputting the converted digital value to a digital arithmetic circuit used for other control or the like.

As describe above, according to the second embodiment of the present invention, the voltage $V_3$ at the junction of the gas temperature measuring resistor 22 and the fixed resistor 24, which are connected in series in the bridge circuit, or the voltage $V_2$ at the junction of the heat resistor 21 and the fixed resistor 23, which are connected in series in the bridge circuit, is supplied to the A/D converter circuit 123 as an input signal. The voltage corresponding to the potential $V_1$ between the bridge circuit and the ground is supplied to the A/D converter circuit 122 as an input signal. The output signal $D_{T2}$ from the A/D converter circuit 122 and the output signal $D_{T3}$ from the A/D converter circuit 123 are supplied to the digital arithmetic circuit 142 to obtain the gas temperature signal digital output $D_T$.

Various circuitries for obtaining a digital value of the gas temperature signal can be conceived. However, with the constitution according to the second embodiment of the present invention, the circuitry can be simple, and the gas temperature signal can be calculated independently of the voltages $V_1$ and $V_2$, or the voltages $V_1$ and $V_3$.

Accordingly, a gas flow rate measuring apparatus can be realized, which includes a digital circuit capable of taking out a highly accurate gas temperature detection signal easily in a simple constitution by a small cost increase.

Several constitutions for obtaining a digital value of the gas temperature signal from the gas flow rate detection circuit 20 using an A/D converter circuit other than the above described first embodiment of the present invention.

Essentially, one of a voltage appearing between the both ends of a single heat resistor with temperature dependence, a single gas temperature measuring resistor, or a combined resistance thereof with several additional fixed resistances, and a voltage appearing between the both ends of a fixed resistor connected in series to the heat resistor or the gas temperature measuring resistor is connected to a reference voltage input of the A/D converter circuit. The other is connected to a conversion input of the A/D converter circuit. In accordance with the situation, a level shift circuit, a buffer, or the like may be added. The gas temperature detection signal can be thus obtained.

Figure 7:
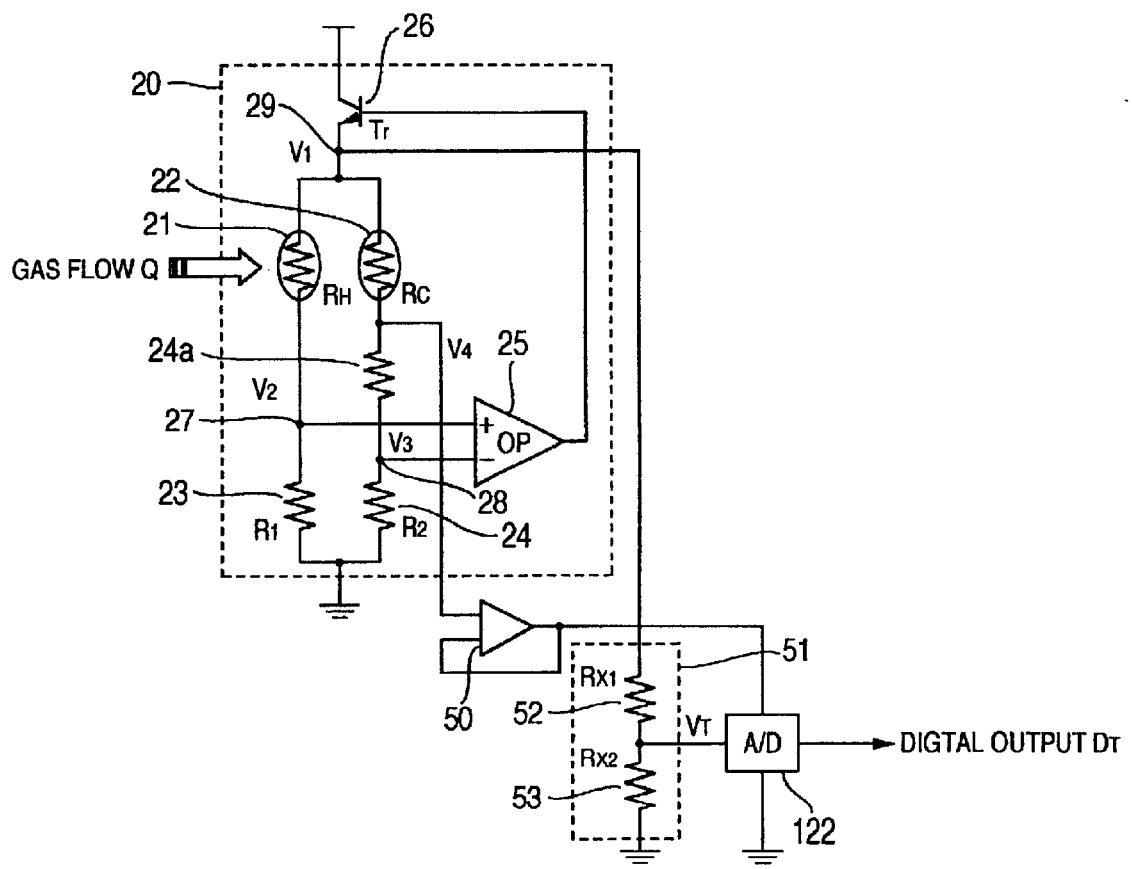
FIG. 7 schematically shows a constitution of another modification example of the first embodiment according to the present invention.

FIG. 7 schematically shows a constitution of another modification example of the gas temperature detection circuit in the gas flow rate measuring apparatus according to the first embodiment of the present invention.

In the example shown in FIG. 7, with respect to the example shown in FIG. 1, a fixed resistor 24a is additionally connected between the gas temperature measuring resistor 22 and the fixed resistor 24. A voltage $V_4$ appearing at the combined resistance of the two fixed resistors 24 and 24a is supplied to the reference voltage input of the A/D converter circuit 122.

Moreover, a voltage corresponding to the voltage $V_1$ appearing between the both ends of the combined resistance of the gas temperature measuring resistor 22 and the two fixed resistors 24 and 24a is connected to the conversion input of the A/D converter circuit 122.

With the above described constitution, the gas temperature signal digital output $D_T$ is calculated by the following equation (19).

$$D_T = \{2^n \cdot R_{X2}/(R_{X1}+R_{X2})\} \cdot \{1+R_{C0}/(R_2+R_3)+(R_{C0}/(R_2+R_3)) \cdot \alpha_C \cdot T\} \quad (19)$$

As described above, the modification example shown in FIG. 7 can achieve an effect similar to the example shown in FIG. 1.

Figure 8:
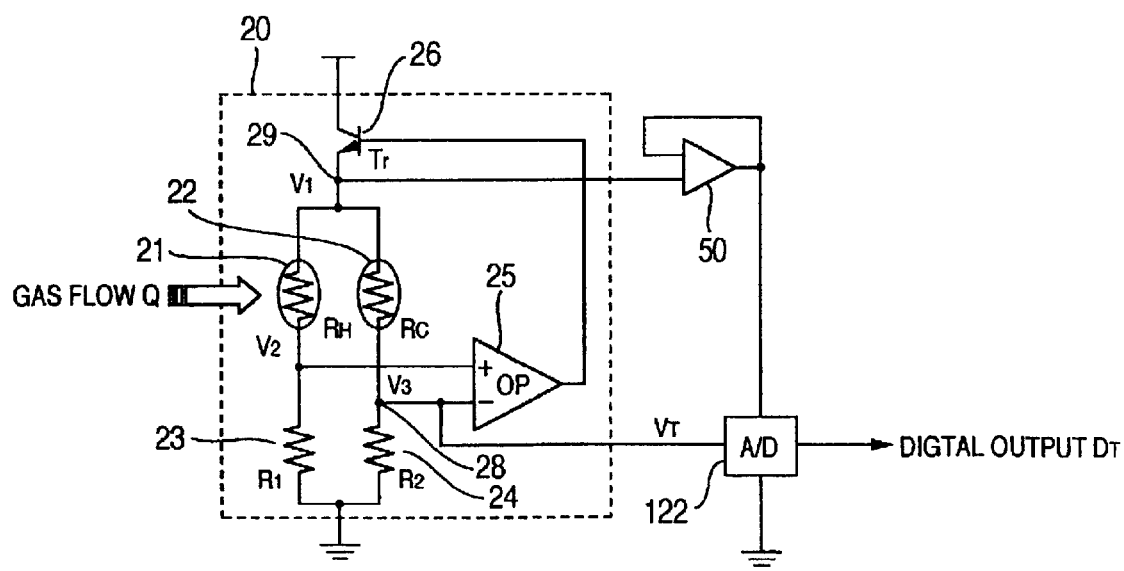
FIG. 8 schematically shows a constitution of still another modification example of the first embodiment according to the present invention.

Moreover, FIG. 8 is a constitutional view schematically showing still another modification example of the first embodiment.

As shown in FIG. 8, in the example shown in FIG. 8, with respect to the example shown in FIG. 1, the connection of the reference voltage input of the A/D converter circuit 122 and the connection of the conversion input thereof are switched with each other.

In the example in FIG. 8, the following equation (20) is established.

$$D_T = 2^n / \{1+(R_{C0}/R_2) \cdot \alpha_C \cdot T\} \quad (20)$$

In this case, the output signal is not linear with respect to the temperature as shown in FIG. 3. However, a signal having linearity with respect to the temperature can be obtained by arithmetic processing of taking an inverse of the gas temperature signal digital output $D_T$ from the A/D converter circuit 122.

Figure 9:
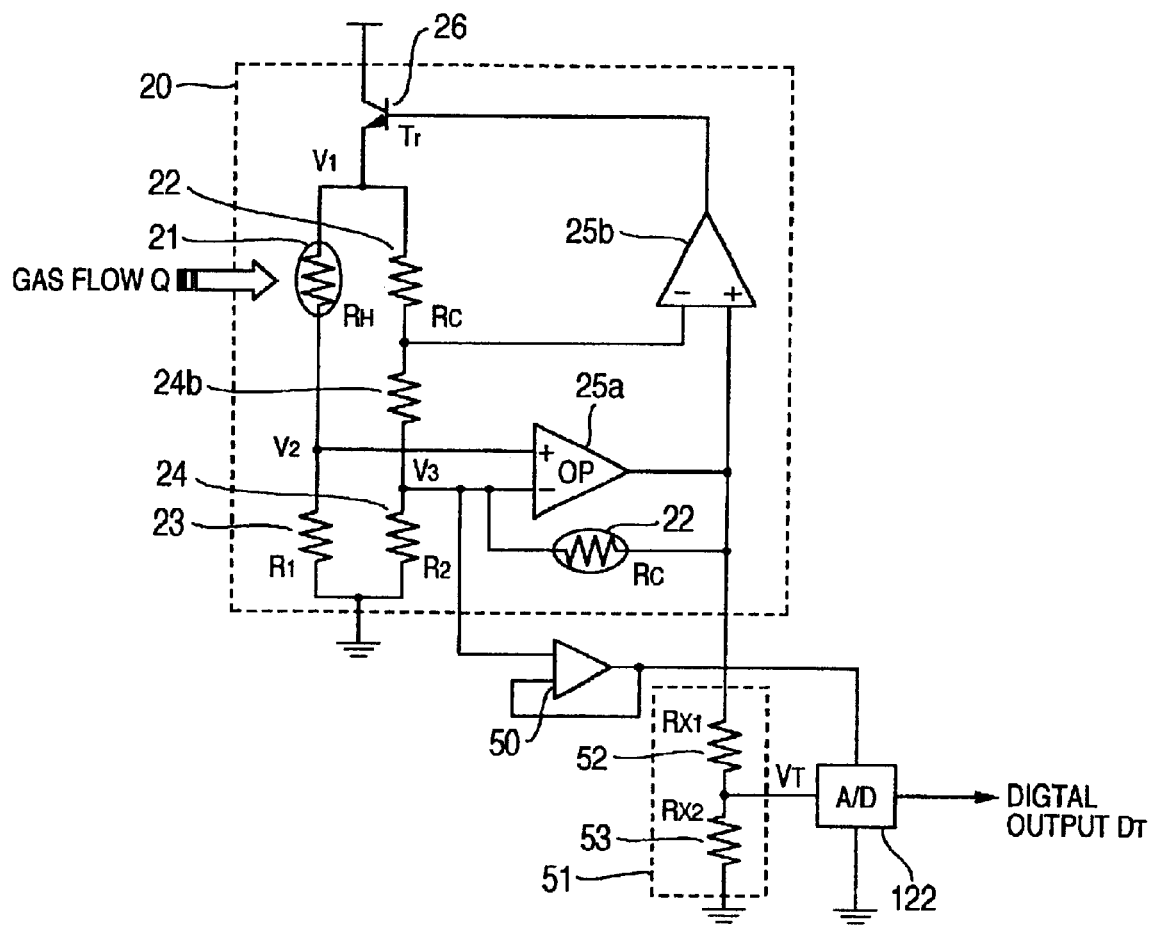
FIG. 9 schematically shows a constitution of still another modification example of the first embodiment according to the present invention.

FIG. 9 shows still another modification example of the first embodiment.

In the example in FIG. 9, instead of the gas temperature measuring resistor 22 of the example in FIG. 1, fixed resistors 24c and 24b, which are connected in series with each other, are connected.

Furthermore, in the example shown in FIG. 9, the output terminal of the operational amplifier 25a is connected to a non-inverting input terminal of an operational amplifier 25b and grounded via the resistors 52 and 53 of the level shift circuit 51.

The junction of the fixed resistors 24c and 24b is connected to an inverting input terminal of the operational amplifier 25b. The output terminal of the operational amplifier 25b is connected to the base of the power transistor 26.

Furthermore, the gas temperature measuring resistor 22 is connected between the inverting input terminal and the output terminal of the operational amplifier 25a.

Also in the constitution shown in FIG. 9, that is, also in the constitution using a bridge circuit that is modification of a simple bridge constitution, the digital output of the gas temperature detection signal can be obtained.

In the case of this constitution of the example shown in FIG. 9, the gas temperature signal digital output $D_T$ is represented by the following equation (21).

$$D_T = \{2^n \cdot R_{X2}/(R_{X1}+R_{X2})\} \cdot \{1/(R_2 \cdot (1/(R_{C0} \cdot (1+\alpha_C \cdot T))+1/R_3))\} \quad (21)$$

Also in the case of the example shown in FIG. 9, the output signal is not linear with respect to the temperature. Accordingly, in order to obtain an output signal linear with respect to the temperature, the gas temperature signal digital output $D_T$ should be subjected to arithmetic processing similar to the example in FIG. 8.

The above described gas temperature signal digital output $D_T$ converted into a digital value can be taken out from the gas flow rate measuring apparatus 10 via the terminal within the connector terminal part 18.

Figure 10:
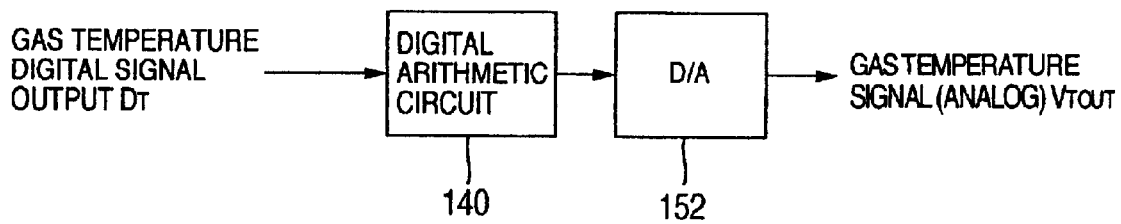
FIG. 10 schematically shows a circuit according to the present invention for outputting a gas temperature detection signal outside.

In this case, as shown in FIG. 10, the gas temperature signal digital output $D_T$ is inputted in a digital arithmetic circuit 140, subjected to zero/span adjustment in the digital arithmetic circuit 140, and then inputted to a D/A converter circuit 152. From the D/A converter circuit 152, an analog output $V_{Tout}$ can be obtained.

Figure 11:
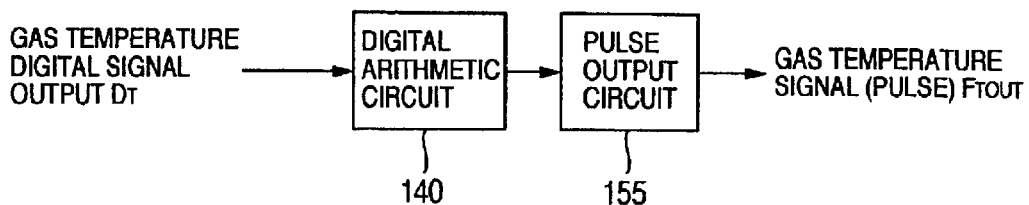
FIG. 11 schematically shows another example of the circuit according to the present invention for outputting the gas temperature detection signal outside.

As shown in FIG. 11, the output signal from the digital arithmetic circuit 140 is inputted to a pulse output circuit 155, and a pulse output $F_{Tout}$ having a frequency or duty ratio corresponding to the temperature can be obtained.

Figure 12:
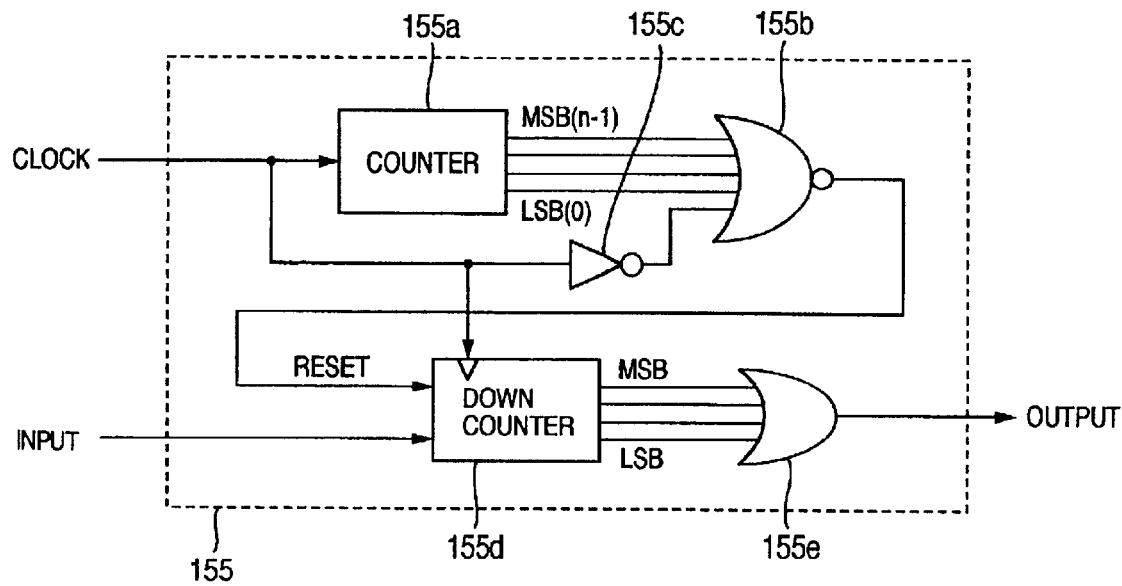
FIG. 12 schematically shows a constitutional view of a circuit for outputting a duty ratio.

As an example of the pulse output circuit 155 thereamong, a constitution of a circuit for outputting a duty ratio is shown in FIG. 12.

The duty ratio output circuit 155 includes a counter 155a, a down counter 155d, a NOT circuit 155c, a NOR circuit 155b and an OR circuit 155e.

Here, outputs from the counter 155a and the down counter 155d are binary.

The counter 155a receives a clock signal and counts the received clock signal. Note that the counter 155a returns to zero on over flow.

The output of n bits from the counter 155a and an output signal obtained by inverting the clock signal, which is inputted to the counter 155a, by means of the NOR circuit 155c are inputted to the NOR circuit 155b.

Accordingly, the NOR circuit outputs "1" only when the output of the counter 155a overflows $2^n-1$ to return to zero. The output signal from the NOR circuit 155b is used as a reset signal of the down counter 155d.

In the down counter 155d, the clock signal, which is inputted to the counter 155a, is inputted as a clock signal. When the reset signal from the NOR circuit 155b is inputted, the signal supplied from the digital arithmetic circuit 140 is accepted as an input value. The accepted input value is set as a counter value, and the counter value is decremented by one for each input of the clock signal.

When the counter value of the down counter 155d becomes 0, the counter value is not decremented any more and maintained to be 0. The output signal from the down counter 155d is inputted to the OR circuit 155e, so that, when the counter value is more than 0, the output is "1", and when the counter value is 0, the output is "0".

Figure 13:
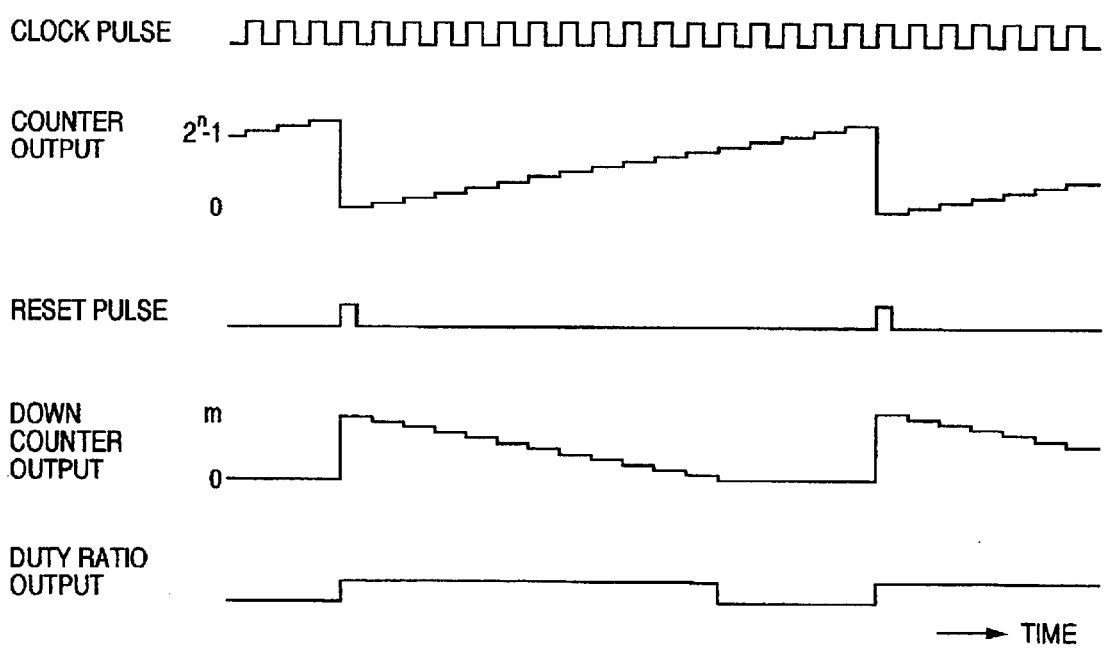
FIG. 13 is an operation chart of the circuit for outputting the duty ratio.

Accordingly, when the input to the duty ratio output circuit 155 is m, the duty ratio output becomes $m/2^n$. In FIG. 13, the operation chart of the duty ration output circuit 155 is shown as reference.

Figure 14:
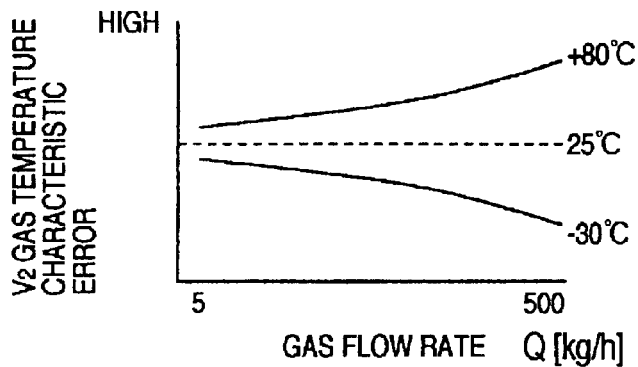
FIG. 14 is a graph showing an example of a gas temperature dependent error of an output from the gas flow rate detection circuit.

Incidentally, the gas temperature dependent error of the gas flow rate detection signal $V_2$ in the gas flow rate detection circuit 20 has a dependence on the gas flow rate, as shown in FIG. 14 as an example. For example, the gas temperature dependent error has a flat dependence at 25° C. At 80° C., as the flow rate is increased, the error is increased in a curved manner. At −30° C., as the flow rate is increased, the error is decreased in a curved manner.

Figure 15:
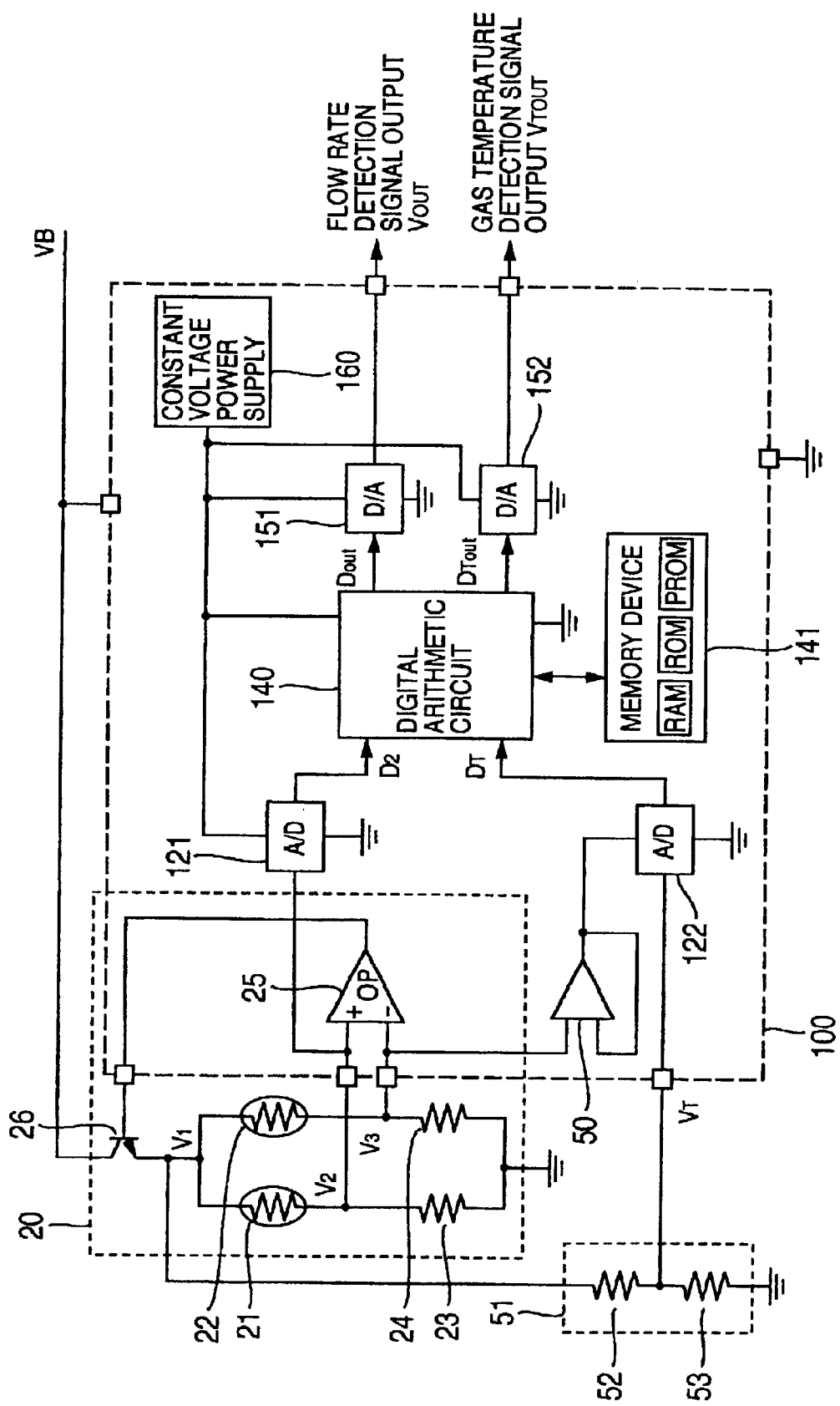
FIG. 15 is a constitutional view schematically showing a circuit used for the gas flow rate measuring apparatus according to the present invention to reduce a temperature dependent error.

However, by using the gas temperature signal digital output $D_T$, the gas temperature dependent error of the gas flow rate detection signal can be reduced. FIG. 15 shows an example of the circuitry for reducing the gas temperature dependent error.

In this circuitry, in addition to the circuitry of FIG. 1, the flow rate detection signal $V_2$ from the flow rate detection circuit 20, that is, the voltage $V_2$ at the junction of the heat resistor 21 and the fixed resistor 23 is inputted to the A/D converter circuit 121 and converted to a digital value. The output signal $D_2$ from the A/D converter circuit 121 is then inputted to the digital arithmetic circuit 140.

The gas temperature detection signal digital output $D_T$ as the output signal from the A/D converter circuit 122 is also inputted to the digital arithmetic circuit 140.

The digital arithmetic circuit 140 performs an arithmetic operation for compensating the error characteristic using the input signals $D_2$ and $D_T$ by means of an appropriate program. The output signal $D_{out}$ therefrom is supplied to the D/A converter circuit 151 to obtain an analog output $V_{out}$ as the flow rate detection signal.

Moreover, the digital gas temperature signal $D_{Tout}$ is outputted from the digital arithmetic circuit 140 to obtain the analog output $V_{Tout}$ of the gas temperature via the D/A converter circuit 152.

Part of these circuits can be integrated as a one-chip integrated circuit 100, for example. The integrated circuit 100 includes the operational amplifier 25, the buffer element 50, the A/D converter circuits 121 and 122, the digital arithmetic circuit 140, a memory device 141, the D/A converter circuits 151 and 152, and a constant-voltage power supply circuit 160.

Here, as a reference voltage power supply of the A/D converter circuit 121 and the D/A converter circuits 151 and 152, the constant-voltage reference power supply circuit 160 of high stability with respect to temperature is used.

The constant-voltage reference power supply circuit 160 can be realized, for example, by use of a band gap reference power supply circuit (band gap voltage source circuit).

Figure 16:
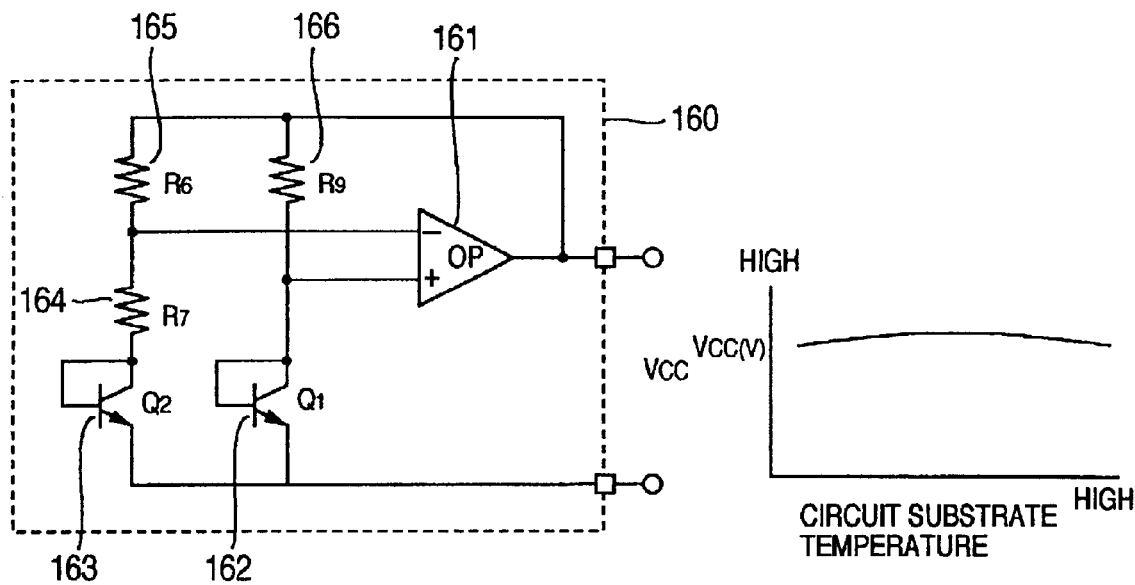
FIG. 16 is a constitutional view schematically showing an example of a constant-voltage reference power supply circuit.

The constitution of the constant-voltage reference power supply circuit 160 is schematically shown in FIG. 16.

In FIG. 16, the constant-voltage reference power supply circuit 160 includes two diode-connected transistors 162 and 163, an operational amplifier 161, and resistors 164, 165, and 166.

The collector of the transistor 162 is connected to a non-inverting input terminal of the operational amplifier 161 and connected to the collector of the transistor 163 via the resistors 166, 165, and 164.

The emitter of the transistor 163 is connected to the emitter of the transistor 162 and connected to one of output terminals of the constant-voltage reference power supply circuit 160.

A junction of the resistors 165 and 164 is connected to an inverting input terminal of the operational amplifier 161. An output terminal of the operational amplifier 161 is connected to a junction of the resistors 166 and 165 and connected to the other output terminal of the constant-voltage reference power supply circuit 160.

By use of the operational amplifier 161, a ratio of a current flowing through the transistor 162 to a current flowing through the transistor 163 becomes fixed determined by the resistance values of the resistors 165 and 166.

In this case, the output voltage from the operational amplifier 161 becomes a certain value allowing the sum of a base-emitter voltage of the transistor 163 and a voltage drop in the resistor 164 to be equal to the base-emitter voltage of the transistor 162.

The voltage drop in the resistor 164 is equal to the difference between the base-emitter voltages of the transistor 163 and the transistor 162, which is proportional to a thermal voltage: VT=kT/q (V: voltage, k: Boltzmann's constant, T: temperature, q: electronic charge). Accordingly, the currents flowing through the resistors 165 and 166 and the transistors 163 and 162 have temperature characteristics with positive linearity.

Generally, since the base-emitter voltage has a negative temperature characteristic, the temperature coefficient of the reference voltage as the output from the band gap reference power supply circuit 160, which is the sum of the base-emitter voltages of the transistors 163 and 162 and the voltage drop in the resistor 164 proportional to the thermal voltage VT, can be linearly approximated or substantially set to zero by changing the resistance values of the resistors 164, 165, and 166.

In FIG. 15, the digital arithmetic circuit 140 performs a calculation of a zero point, span adjustment and temperature compensation of the gas temperature dependent error of the flow rate detection signal $V_2$ with the following equation (22) by a predetermined arithmetic program stored in the memory device 141 as a memory, and thus a result of a digital output $D_{out}$ is obtained.

$$D_{out}=f(D_2, D_T) \quad (22)$$

The adjustment coefficients (constants) of the zero point, the span, and the gas temperature dependent error for the above equation are stored in the memory device 141.

These adjustment coefficients are externally written in the memory device 141 via the terminal of the connector terminal part 18 in adjusting the output characteristic of the gas flow rate measuring apparatus 10. Moreover, the digital arithmetic circuit 140 can easily perform an arbitrary non-linear operation as well as a linear operation for the zero point and the span. Accordingly, in output adjustment, non-linear adjustment can be easily performed.

The non-linear adjustment allows an adjustment accuracy within ±2%.

Figure 17:
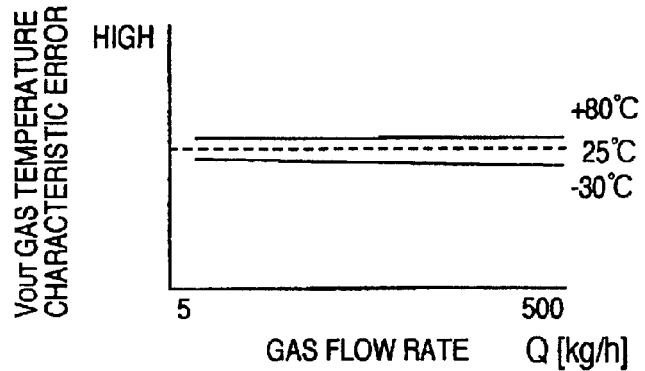
FIG. 17 shows an example of a circuit for reducing the gas temperature dependent error of the output from the gas flow rate measuring apparatus according to the present invention.

The calculation result $D_{out}$ obtained by the digital arithmetic circuit 140 is inputted in the D/A converter circuit 151 to obtain the analog voltage output (flow rate detection signal output) $V_{out}$ corresponding to the flow rate. By adjusting the gas temperature dependent error with the above equation (22), the gas temperature dependent error of the output from the gas flow rate measuring apparatus 10 is reduced, for example, as shown in FIG. 17. Specifically, change in the error with respect to the change in the gas flow rate is approximated to 0 and the error itself is reduced even when the gas temperature is 80° C. or −30° C.

Furthermore, a substrate temperature dependent error can be also reduced by inputting a temperature detection signal of the circuit substrate 100 to the digital arithmetic circuit 140. An example of the circuitry for reducing the substrate temperature dependent error is shown in FIG. 18.

Figure 18:
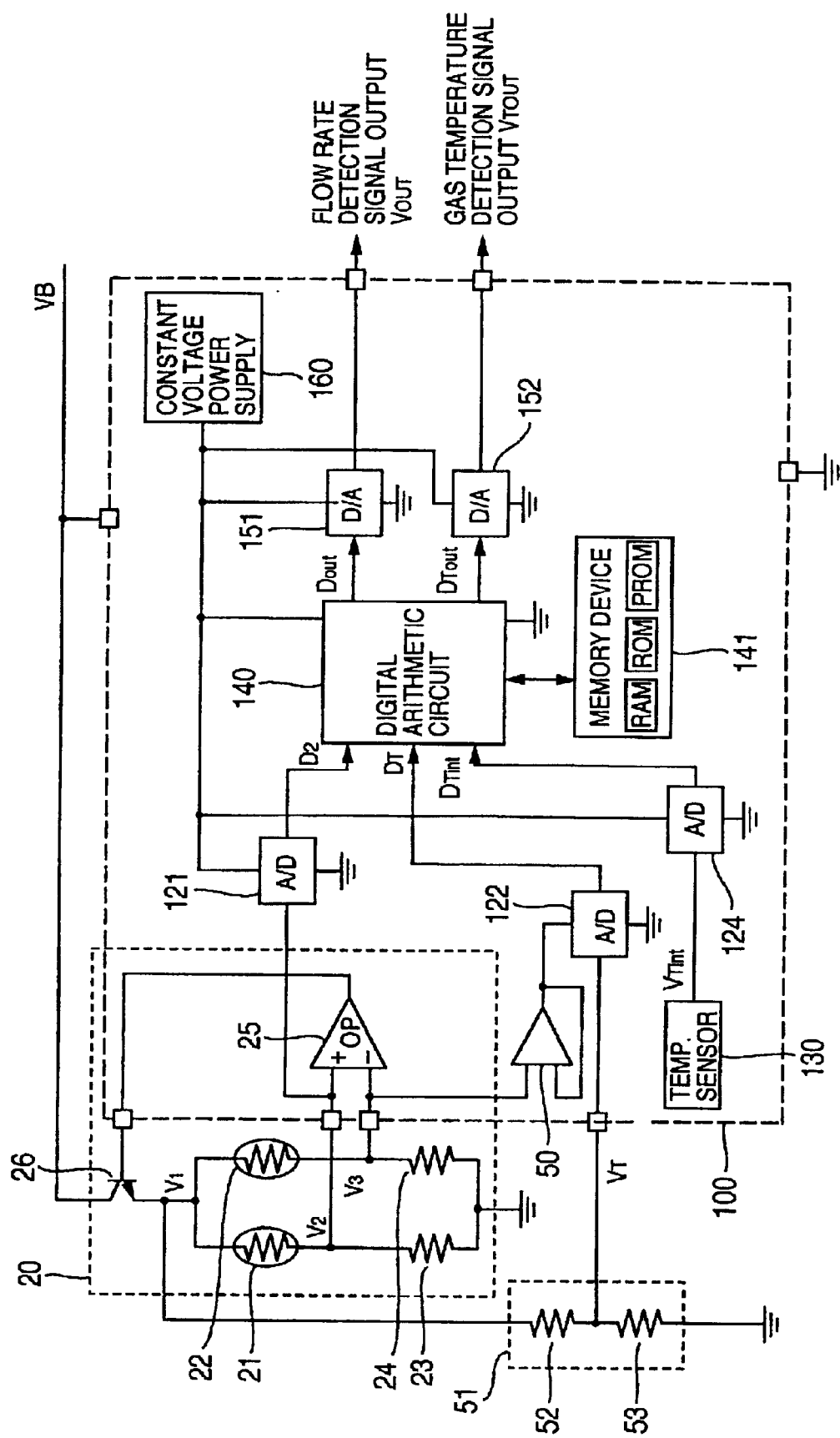
FIG. 18 shows another example of the circuit for reducing the gas temperature dependent error of the output from the gas flow rate measuring apparatus according to the present invention.

In the circuitry shown in FIG. 18, with respect to the example shown in FIG. 15, a temperature sensor 130 in the circuit substrate 100 and an A/D converter circuit 124 for converting an output $V_{Tint}$ of the temperature sensor 130 into a digital value are added. The digital output $D_{Tint}$ of the temperature sensor 130 is inputted to the digital arithmetic circuit 140.

The digital arithmetic circuit 140 performs a calculation of a zero point, span adjustment and temperature compensation of the gas temperature dependent error or the substrate temperature dependent error of the flow rate detection signal $V_2$ with the following equation (23) by a predetermined arithmetic program stored in the memory device 141, and thus the digital output $D_{out}$ is obtained.

$$D_{out}=f(D_2, D_T, D_{Tint}) \quad (23)$$

The circuitry shown in FIG. 18 allows the substrate temperature dependent error to be reduced.

Moreover, a response time of the circuit output for change in the gas temperature or the substrate temperature is long enough compared to the converting time in the A/D converter circuit. Accordingly, when such temperature is subjected to a digital conversion in the A/D converter circuit, the A/D converter circuit may be used as both the converter circuit for the gas temperature detection signal and the converter circuit for the temperature sensor, and the digital output from the A/D converter circuit may be obtained while switching the input signal thereto.

With the constitution described above, one A/D converter circuit can be omitted.

Figure 19:
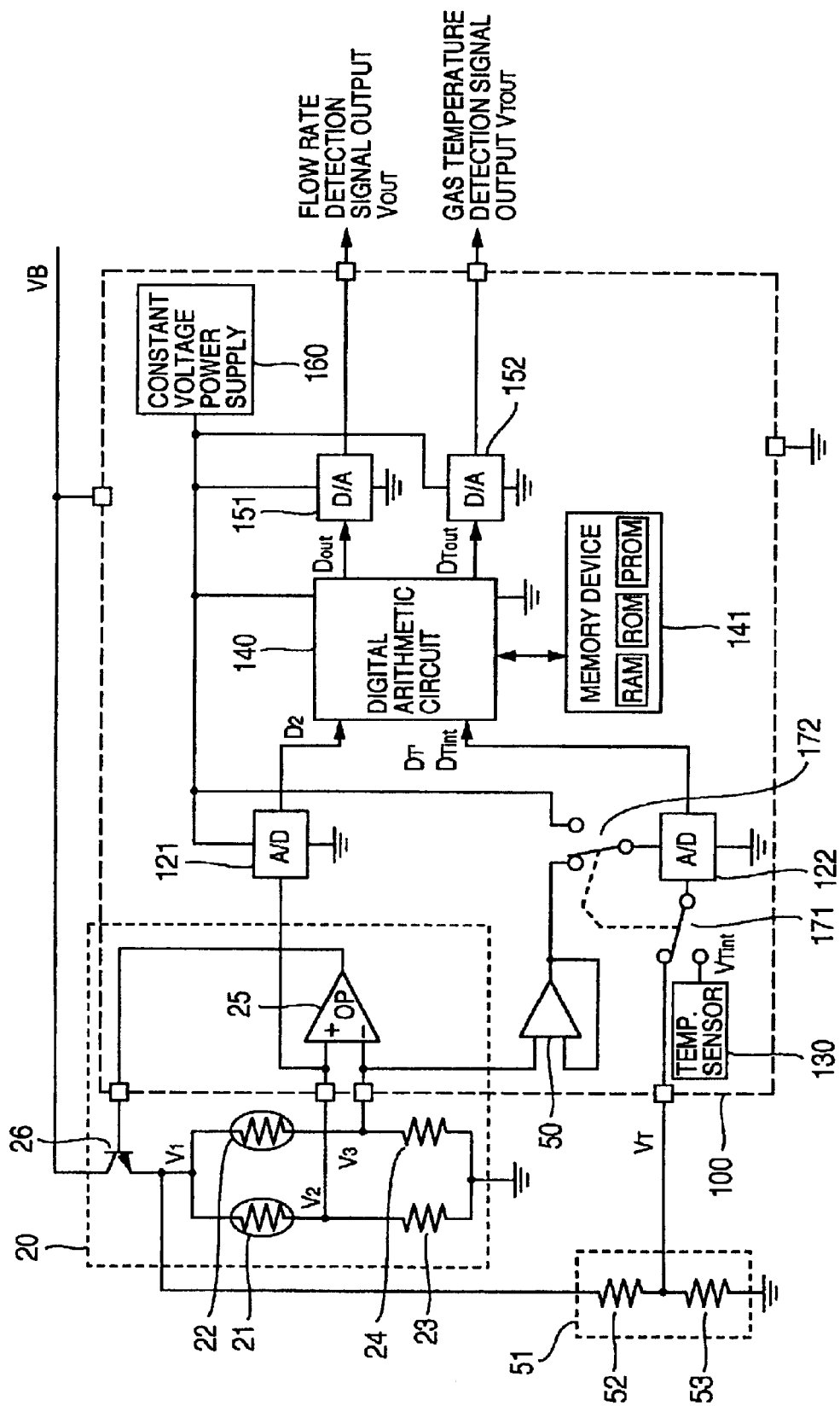
FIG. 19 shows still another example of the circuit for reducing the gas temperature dependent error of the output from the gas flow rate measuring apparatus according to the present invention.

An example of sharing the A/D converter circuit is shown in FIG.19.

In FIG. 19, the voltage $V_3$ from the gas flow rate detection circuit 20 and the reference voltage from the constant-voltage reference power supply circuit 160 are switched over with each other by means of a switch 172 and supplied to the reference voltage input of the A/D converter circuit 122. The level shifted output $V_T$ of the voltage $V_1$ of the gas flow rate detection circuit 20 and the output $V_{Tint}$ from the temperature sensor 130 in the circuit 100 are used as a conversion inputs of the A/D converter circuit 122 by switching over therebetween with a switch 171.

The switches 171 and 172 are switched over in conjunction with each other. Specifically, when the switch 171 is set to the level shifted output $V_T$ side, the switch 172 is set to the voltage $V_3$ side, and when the switch 171 is switched to the temperature sensor 130 side, the switch 172 is switched to the constant-voltage power supply circuit 160 side. Accordingly, the detection signals for the gas temperature and the circuit substrate temperature can be switched with each other for digital output.

In the example shown in FIG. 15, compensation of the temperature dependent error is made for the example shown in FIG. 1. However, for the example shown in FIG. 5, compensation of the temperature dependent error can be made also.

Specifically, with the constitution that the output signal from the digital arithmetic circuit 142 shown in FIG. 5 is supplied to the A/D converter circuit 122, and the voltage at the junction of the heat resistor 21 and the fixed resistor 23 is supplied to the A/D converter circuit 121, compensation of the temperature dependent error can be made in the example shown in FIG. 5.

The examples shown in FIGS. 18 and 19 can be also applied to the example shown in FIG. 5.

According to the present invention, a gas flow rate measuring apparatus can be realized, which includes a digital circuit capable of taking out a highly accurate gas temperature detection signal easily in a simple constitution by a small cost increase.

Moreover, two types of temperature dependent error of the gas flow rate detection signal caused by changes in the gas temperature and the circuit substrate temperature can be compensated based on the detection signals of the gas temperature and the substrate temperature with high accuracy at low costs.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An apparatus for measuring a gas flow rate, which includes one or a plurality of first resistors arranged in a gas passage, and a gas flow rate detection circuit for outputting a gas flow rate detection signal representative of a gas flow rate in the gas passages, by detecting one of currents flowing through the first resistors and voltages generated in accordance with said currents, said apparatus comprising:

a fixed resistor connected in series to one of the first resistors; and a first A/D converter circuit for converting an input voltage into a digital signal based on a reference voltage and outputting the digital signal; wherein, a voltage generated in said fixed resistor is used as the reference voltage;

a voltage generated in a combined resistance of the first resistor and said fixed resistor is used as the input voltage; and a digital output signal of a gas temperature signal is obtained by said first A/D converter circuit.

2. An apparatus for measuring a gas flow rate, which includes one or a plurality of resistors arranged in a gas passage, and a gas flow rate detection circuit for outputting a gas flow rate detection signal representative of a gas flow rate in the gas passage, by detecting one of currents flowing through the resistors and voltages generated in accordance with said currents, said apparatus comprising:

a fixed resistor connected in series to one of the first resistors;

a first A/D converter circuit for converting an input voltage into a digital signal and outputting the digital signal, using a voltage generated in a combined resistance of the first resistor and said fixed resistor as the input voltage;

a second A/D converter circuit for converting an input voltage into a digital signal and outputting the digital signal, using a voltage generated in said fixed resistor as the input voltage; and a first digital arithmetic circuit for dividing the digital output signal from said first A/D converter circuit by the digital output signal from said second A/D converter circuit; wherein, a digital output signal of a gas temperature signal is obtained by said first digital arithmetic circuit.

3. The apparatus for measuring a gas flow rate according to claim 1, further comprising:

a D/A converter circuit for receiving the digital output signal of the gas temperature signal, converting the digital signal into an analog signal, and outputting the analog signal.

4. The apparatus for measuring a gas flow rate according to claim 2, further comprising:

a D/A converter circuit for receiving the digital output signal of the gas temperature signal, converting the digital signal into an analog signal, and outputting the analog signal.

5. The apparatus for measuring a gas flow rate according to claim 1, further comprising:

a pulse converter circuit for receiving the digital output signal of the gas temperature signal, and outputting a pulse signal based on the received digital signal.

6. The apparatus for measuring a gas flow rate according to claim 2, further comprising:

a pulse converter circuit for receiving the digital output signal of the gas temperature signal, and outputting a pulse signal based on the received digital signal.

7. The apparatus for measuring a gas flow rate according to claim 1, further comprising:

a second A/D converter circuit for converting the gas flow rate detection signal outputted from the gas flow rate detection circuit into a digital signal; and a digital arithmetic circuit for receiving an output signal from said second A/D converter circuit and an output signal from said first A/D converter circuit, and compensating a temperature dependent error of the gas flow rate detection signal.

8. The apparatus for measuring a gas flow rate according to claim 2, further comprising:

a third A/D converter circuit for converting the gas flow rate detection signal outputted from the gas flow rate detection circuit into a digital signal; and a second digital arithmetic circuit for receiving an output signal from said third A/D converter circuit and an output signal from said first digital arithmetic circuit, and compensating a temperature dependent error of the gas flow rate detection signal.

9. The apparatus for measuring a gas flow rate according to claim 7, further comprising:

a circuit substrate;

a temperature sensor for measuring temperature of the circuit substrate; and a fourth A/D converter circuit for converting a circuit substrate temperature detection signal from said temperature sensor into a digital value; wherein, a temperature dependent error of the gas flow rate detection signal is compensated using digital values of the gas flow rate detection signal, the gas temperature signal, and the circuit substrate temperature detection signal.

10. The apparatus for measuring a gas flow rate according to claim 8, further comprising:

a circuit substrate;

a temperature sensor for measuring temperature of the circuit substrate; and a fourth A/D converter circuit for converting a circuit substrate temperature detection signal from said temperature sensor into a digital value; wherein, a temperature dependent error of the gas flow rate detection signal is compensated using digital values of the gas flow rate detection signal, the gas temperature signal, and the circuit substrate temperature detection signal.

11. The apparatus for measuring a gas flow rate according to claims 7, further comprising:

a circuit substrate;

a temperature sensor for measuring temperature of the circuit substrate; and switching means for switching between a circuit substrate temperature detection signal from said temperature sensor and the gas temperature signal, to input any signal thereof to said first A/D converter circuit; wherein, a temperature dependent error of the gas flow rate detection signal is compensated using digital values of the gas flow rate detection signal, the gas temperature signal, and the circuit substrate temperature detection signal.

12. The apparatus for measuring a gas flow rate according to claims 8, further comprising:

a circuit substrate;

a temperature sensor for measuring temperature of the circuit substrate; and switching means for switching between a circuit substrate temperature detection signal from said temperature sensor and the gas temperature signal, to input any signal thereof to said first A/D converter circuit; wherein, a temperature dependent error of the gas flow rate detection signal is compensated using digital values of the gas flow rate detection signal, the gas temperature signal, and the circuit substrate temperature detection signal.

13. An apparatus for measuring a gas flow rate, comprising:

a heat resistor arranged in a gas passage;

a first fixed resistor connected in series to the heat resistor;

a gas temperature measuring resistor arranged in the gas passage;

a second fixed resistor connected in series to the gas temperature measuring resistor;

current control means for controlling a current flowing through a bridge circuit including the heat resistor, the first fixed resistor, the gas temperature measuring resistor, and the second fixed resistor;

a gas flow rate detection circuit for outputting a gas flow rate detection signal in accordance with a gas flow rate flowing in the gas passage based on the current flowing through the bridge circuit; and an A/D converter circuit for converting an input voltage into a digital signal based on a reference voltage and outputting the digital signal; wherein, one of a voltage at a junction of the heat resistor and the first fixed resistor, and a voltage at a junction of the gas temperature measuring resistor and the second fixed resistor, is used as the reference voltage;

a voltage generated in a combined resistance of the gas temperature measuring resistor and the second fixed resistor is used as the input voltage; and a digital output signal of a gas temperature signal is obtained by said A/D converter circuit.

* * * * *